(12) United States Patent
Perrella et al.

(10) Patent No.: US 10,353,270 B2
(45) Date of Patent: Jul. 16, 2019

(54) SYSTEM AND METHOD FOR GENERATING AN OPTICAL FREQUENCY STANDARD

(71) Applicant: THE UNIVERSITY OF ADELAIDE, Adelaide (AU)

(72) Inventors: Christopher Perrella, Adelaide (AU); Philip Stephen Light, Adelaide (AU); Andre Nicholas Luiten, Adelaide (AU)

(73) Assignee: The University of Adelaide, Adelaide (AU)

( * ) Notice: Subject to any disclaimer, the term of this patent is extended or adjusted under 35 U.S.C. 154(b) by 0 days.

(21) Appl. No.: 15/741,481

(22) PCT Filed: Jul. 1, 2016

(86) PCT No.: PCT/AU2016/000238
§ 371 (c)(1),
(2) Date: Jan. 2, 2018

(87) PCT Pub. No.: WO2017/004656
PCT Pub. Date: Jan. 12, 2017

(65) Prior Publication Data
US 2018/0329274 A1 Nov. 15, 2018

(30) Foreign Application Priority Data
Jul. 3, 2015 (AU) .................................. 2015902634

(51) Int. Cl.
*G02F 1/37* (2006.01)
*H01S 3/067* (2006.01)
(Continued)

(52) U.S. Cl.
CPC .............. *G02F 1/37* (2013.01); *G02F 1/3501* (2013.01); *G02F 1/3532* (2013.01);
(Continued)

(58) Field of Classification Search
CPC ........ G02F 1/3501; G02F 1/3532; G02F 1/37; H01S 3/0092; H01S 3/1306; H01S 3/2383
See application file for complete search history.

(56) References Cited

U.S. PATENT DOCUMENTS 4,899,345 A 2/1990 Cyr et al.
5,866,896 A * 2/1999 Georgiades ........... G02F 1/3526
250/201.1
(Continued)

FOREIGN PATENT DOCUMENTS

JP 2000275107 A * 10/2000 ............... G02F 1/37
JP 2006073755 A 3/2006

OTHER PUBLICATIONS

International Search Report dated Sep. 19, 2016, issued in corresponding International Application No. PCT/AU2016/000238, filed Jul. 1, 2016, 6 pages.
(Continued)

*Primary Examiner* — Daniel Petkovsek
(74) *Attorney, Agent, or Firm* — Christensen O'Connor Johnson Kindness PLLC (57) ABSTRACT

A system for generating an optical frequency standard is described. The system is based on a two-color approach and includes a first laser source that generates a first laser output at a first frequency and a second laser source that generates a second laser output at a second frequency corresponding. The first and second laser outputs are then respectively input into first and second harmonic generators to form frequency-doubled first and second laser outputs. The system also includes a two-color stabilization arrangement to stabilize the sum of the frequencies generated by first and second laser sources, including, for example, an interaction region incorporating a laser active material. The interaction region (Continued)

can be a gas reference cell and the laser active material can be Rubidium (in vapor form) having a two-photon transition.

19 Claims, 7 Drawing Sheets

(51) Int. Cl.
  *H01S 3/13* (2006.01)
  *H01S 3/00* (2006.01)
  *G02F 1/35* (2006.01)
  *H01S 3/23* (2006.01)
(52) U.S. Cl.
  CPC .......... *H01S 3/0085* (2013.01); *H01S 3/0092* (2013.01); *H01S 3/067* (2013.01); *H01S 3/1303* (2013.01); *H01S 3/1305* (2013.01); *H01S 3/1306* (2013.01); *H01S 3/2383* (2013.01); *G02F 2001/3507* (2013.01)

(56) References Cited

U.S. PATENT DOCUMENTS

| 7,809,222 B2* | 10/2010 | Hartl ..................... G02F 1/365 385/122 |
| 8,780,948 B2 | 7/2014 | Wilkinson et al. |
| 8,816,302 B2 | 8/2014 | Mei et al. |
| 2014/0321487 A1 | 10/2014 | Wilkinson et al. |

OTHER PUBLICATIONS

International Preliminary Report on Patentability and Written Opinion of the International Searching Authority dated Jan. 9, 2018, issued in corresponding International Application No. PCT/AU2016/000238, filed Jul. 1, 2016, 7 pages.

Akulshin, A.M., et al., "Doppler-free two photon resonances for atom detection and sum frequency stabilization," Journal of Physics B: Atomic, Molecular and Optical Physics, 44(21):215401, Oct. 18, 2011, 7 pages.

Alden, E.A., et al., "Two-photon E1-M1 optical clock," Physical Review A 90:012523, Jul. 25, 2014, 10 pages.

Bjorklund, G.C., et al., "Frequency modulation (FM) spectroscopy," Applied Physics B Photophysics and Laser Chemistry, 32(3):145-152, Jul. 31, 1983.

Cliche, J., et al., "Turnkey compact frequency standard at 1556 nm based on Rb two-photon transitions," Conference on Precision Electromagnetic Measurements, IEEE vol. 2, pp. 674-675, Jun. 27-Jul. 2, 2004.

Cliche, J., et al., "A Commercial Optical Frequency Standard at 1556 nm Incorporating a Narrowed Linewidth Semiconductor Laser and a Rubidium Two-Photon Referencing Module," Proceedings of the First ESA Optical Clock Workshop, ESTEC, Noordwijk, the Netherlands, Jun. 2005, 8 pages.

Cliche, J., et al., "Ultra-Narrow Linewidth and High Frequency Stability Laser Sources," Optical Amplifiers and Their Applications/Coherent Optical Technologies and Applications, Technical Digest (CD) (Optical Society of America, 2006), paper CFC5, Jun. 2006, 3 pages.

Ducos, F., et al., "Development of an optical frequency comb around 1556 nm referenced to an Rb frequency standard at 778 nm," The European Physical Journal Applied Physics 20(3):227-231, Nov. 2002.

Hilico, L., et al., "Metrological features of the rubidium two-photon standards of the BNM-LPTF and Kastler Brossel Laboratories," The European Physical Journal Applied Physics 4(2):219-225, Jun. 1998.

Perella, C., et al., "High Resolution Two-Photon Spectroscopy of Rubidium within a Confined Geometry," Physical Review A 87(1), Jan. 2013, 5 pages.

Perella, C., et al., "Two-color rubidium fiber frequency standard", Optics Letters 38(12): 2122-2124, Jun. 15, 2013.

Poulin, M., et al., "An absolute frequency reference at 192.6 THz (1556 nm) based on a two-photon absorption line of rubidium at 778 nm for WDM communication systems," IEEE Photonics Technology Letters 9(12):1631-1633, Dec. 1997.

* cited by examiner

SYSTEM AND METHOD FOR GENERATING AN OPTICAL FREQUENCY STANDARD

PRIORITY DOCUMENTS

The present application claims priority from Australian Provisional Patent Application No. 2015902634 titled "SYSTEM AND METHOD FOR GENERATING AN OPTICAL FREQUENCY STANDARD" and filed on 3 Jul. 2015, the content of which is hereby incorporated by reference in its entirety.

INCORPORATION BY REFERENCE

The following publications are referred to in the present application and their contents are incorporated by reference in their entirety:
  Demtroder, W. (2003). Laser Spectroscopy (3rd ed.). Springer; and
  Bjorklund, G. C., Levenson, M. D., Lenth, W., & Ortiz, C. (1983). Frequency modulation (FM) spectroscopy. Applied Physics B Photophysics and Laser Chemistry, 32(3), 145-152.

TECHNICAL FIELD

The present disclosure relates to providing an optical frequency standard. In a particular form, the present disclosure relates to providing an optical frequency standard based on a two photon transition that employs two different colour lasers to drive the transition.

BACKGROUND

An optical frequency standard is an optical system that provides an optical signal having a very well defined frequency. These systems have many applications including metrology, astronomy, telecommunications, global positioning systems and scientific research into fundamental physics.

Typically, an optical frequency standard involves stabilising the frequency of a laser to a frequency reference such as an atomic transition having a transition frequency of Two important factors in the performance of an optical frequency standard include its accuracy and its precision or stability. An optical frequency standard's accuracy is typically characterised by how well its output can be related to the unit of the second which is defined to be the duration of 9,192,631,770 periods of the radiation corresponding to the transition between the two hyperfine levels of the ground state of the caesium-133 atom. The precision or stability of an optical frequency standard will characterise how reproducible the frequency is between successive measurements or how unchanging it is over various time durations.

In many applications such as metrology and telecommunications, the stability of the optical frequency standard is more important than its inherent accuracy. Where the optical frequency standard involves a laser stabilised to an atomic transition having a transition frequency of $f_0$, the atomic transition will have an associated optical line width of $\gamma$. For a given signal to noise ratio (SNR) for detection of the atomic transition, the stability of the optical frequency standard, $\sigma(\tau)$, for a given integration time $\tau$ is defined by:

$$\sigma(\tau) \propto \frac{\gamma}{f_0} \frac{1}{SNR} \frac{1}{\sqrt{\tau}}$$

Accordingly, an optimal stable optical frequency standard will ideally involve a high transition frequency with an associated narrow line width and a large SNR for the system.

Figure 1:
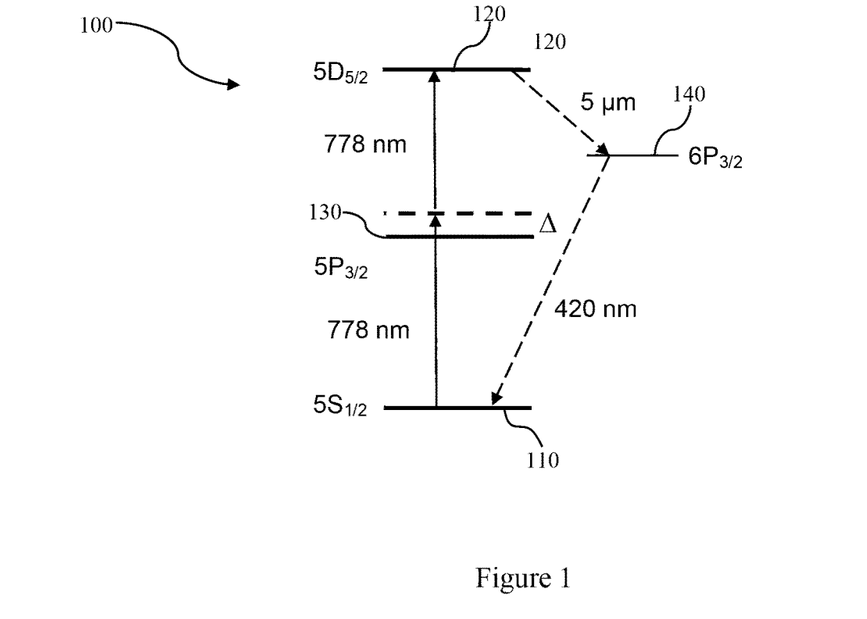
FIG. 1 is a schematic of a single-colour two-photon transition scheme for an optical frequency standard.

One attempt to devise such a stable system has been based on the atomic transition of Rubidium between the energy levels $5S_{1/2} \rightarrow 5D_{5/2}$. This transition has a transition frequency $f_0$ of 770.6 THz, i.e. a relatively high frequency, and further has a relatively narrow natural line width $\gamma$ of 660 kHz. A single photon at $f_0$ of 770.6 THz cannot effectively excite this transition as it does not satisfy the angular momentum selection rules for this transition. However, if two photons, whose own frequencies sum to $f_0$ of 770.6 THz, arrive at the atom nearly simultaneously, then it is possible to drive the transition. Such a process is referred to as a "two-photon" transition. Traditionally, two photons from the laser source are used to drive the transition. Naturally, this means that the frequency of each photon is exactly half that of the energy separation in transition, i.e., 770.6/2 THz=385.3 THz. Referring now to FIG. 1, there is shown the traditional excitation scheme 100 for the $5S_{1/2} \rightarrow 5D_{5/2}$ atomic transition for Rubidium showing the two-photon transition from the $5S_{1/2}$ state 110 to the $5D_{5/2}$ state 120 where the excitation photons each have a wavelength of 778 nm corresponding to 385.3 THz. Detection of the two-photon transition is either by measurement of 778 nm absorption or 420 nm fluorescence as the electron returns to the $5S_{1/2}$ state via the intermediate $6P_{3/2}$ state 140.

Unfortunately, the $5S_{1/2} \rightarrow 5D_{5/2}$ is a weak transition resulting in a relatively low SNR and, as a result, a much reduced stability. As can be seen in FIG. 1, there is an intermediate $5P_{3/2}$ state 130 which lies almost midway between the $5S_{1/2}$ state 110 and the $5D_{5/2}$ state 120. The presence of these intermediate energy levels can greatly increase the transition rate in a two-photon process between the lower and upper energy levels. Unfortunately, if the transition is driven with two photons at the same frequency then there is a large optical detuning of A from the intermediate $5P_{3/2}$ state 130 of approximately 1 THz for this excitation scheme. This significant detuning is an important contributor to the weak two-photon transition rate in this instance.

A number of approaches have been adopted in an attempt to increase the SNR of these two-photon systems. These include the use of higher powered lasers and optical cavities to effectively increase laser intensity in the interaction zone and as a result increase the two-photon transition rate and/or increasing the number of Rubidium atoms that the laser can interact with by increasing the Rubidium vapour pressure. Unfortunately, these approaches tend to increase the size, fragility, power consumption or complexity of the resulting system. Many of these approaches also introduce unwanted inaccuracies and imprecision to the system when the performance is considered over the longer term.

Figure 2:
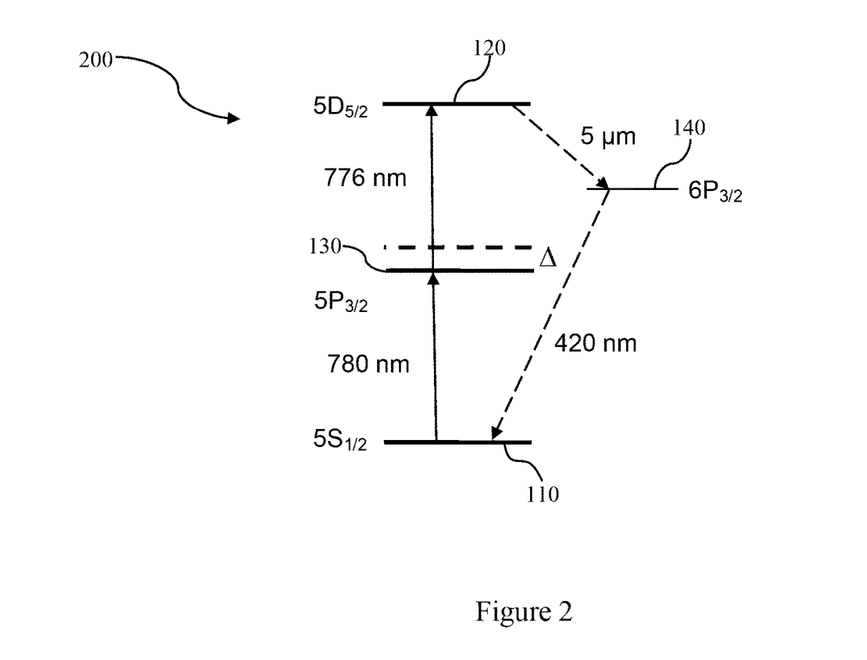
FIG. 2 is a schematic of a two-colour two-photon transition scheme for an optical frequency standard.

This has led to an alternative "two-colour" approach to excitation as contrasted to the "single-colour" approach where the wavelengths of each photon are the same. Referring now to FIG. 2, there is shown an excitation scheme for the $5S_{1/2} \rightarrow 5D_{5/2}$ atomic transition similar to FIG. 1, except that the first photon has a wavelength of 780 nm and the second photon has a wavelength of 776 nm. As can be seen from FIG. 2, the detuning relative to the intermediate $5P_{3/2}$ state 130 is greatly reduced to as little as approximately 1 GHz, producing an approximate $10^6$ increase in the two-photon transition rate and hence the SNR. In theory, the high optical power and/or optical cavities of single-colour two-photon systems would not be required for a two-colour based system having comparable stability making such an approach potentially suitable for implementation in a compact or portable configuration.

Unfortunately, the standard two-colour approach also has some significant drawbacks in that it is the sum of the two input wavelengths that is stabilised and not either of the individual wavelengths. Put another way, neither the 780 nm nor 776 nm source lasers could be separately employed as a stable optical source—only their sum is stabilised to the two-photon transition.

SUMMARY

In a first aspect, the present disclosure provides a system for generating an optical frequency standard comprising:
  a first laser source for generating a first laser output at a first frequency;
  a first second harmonic generator receiving as an input the first laser output to generate a frequency-doubled first laser output at a doubled first frequency;
  a second laser source for generating a second laser output at a second frequency different from the first frequency;
  a second second harmonic generator receiving as an input the second laser output to form a frequency-doubled second laser output at a doubled second frequency;
  a two-colour stabilisation arrangement to stabilise a sum of the doubled first and the doubled second frequencies including:
    an interaction region incorporating a laser active material, the laser active material having a two-photon transition from a first energy level to a second energy level, the interaction region configured to receive as an input the frequency-doubled first laser output and the frequency-doubled second laser output, the frequency-doubled first laser output and the frequency-doubled second laser output selected to together cause the two-photon transition from the first energy level to the second energy level using an intermediate energy level to enhance the two-photon transition rate; and
    a detector to detect an indicator of the two-photon transition occurring in the interaction region, the detector generating a frequency stabilisation signal for modifying either the first laser output or the second laser output to stabilise the sum of the doubled first frequency and the doubled second frequency originating from the first and second laser sources to the two-photon transition based on the indicator;
  a stabilised optical output generator including a sum frequency generator receiving as an input the first laser output and the second laser output to generate a stabilised optical output with a frequency corresponding to the optical frequency standard.

In another form, the first and/or second frequency is in the telecommunications wavelength band.

In another form, the interaction region is a gas reference cell.

In another form, the gas reference cell is based on an isotopically pure gas.

In another form, the gas reference cell is based on a Group I element.

In another form, the gas reference cell is a Rubidium cell.

In another form, the indicator of the two photon transition occurring in the interaction region is fluorescence emitted from the interaction region as atoms transition either directly or indirectly from the second energy level to the first energy level.

In another form, the indicator of the two-photon transition occurring in the interaction region is the absorption of the frequency-doubled first and/or second laser output associated with the two-photon transition.

In another form, the system further includes a single-photon stabilisation arrangement for stabilising the first or second laser output, or the doubled first frequency or the doubled second frequency of the first or second frequency-doubled laser output respectively.

In another form, the single-photon stabilisation arrangement is to stabilise detuning from the intermediate energy level.

In another form, the two-colour stabilisation arrangement further includes a frequency modulator to frequency modulate the first and/or second laser output at a modulation frequency for detection by the detector following the two-photon transition to generate the frequency stabilisation signal.

In another form, the system further includes an optical amplification stage to increase the optical power of the first and/or second laser output.

In another form, the system further includes a power control arrangement to modulate and/or stabilise the amplitude of the first and/or second laser output.

In another form, the power control arrangement includes an amplitude modulator to modulate the amplitude of the first and/or second laser output and a detector to detect the amplitude modulation on the first and/or second laser output following passage through the interaction region to provide a measure of the optical power from the first and/or second laser output interacting with the interaction region to generate a power control signal to stabilise the optical power in the interaction region.

In another form, the first and/or second laser is selected from any one of: a fibre laser; a diode laser; a distributed feedback (DFB) laser; a distributed Bragg reflector laser; or a vertical external cavity surface emitting laser (VECSEL).

In a second aspect, the present disclosure provides an optical frequency standard generated by the system described in accordance with the first aspect of the disclosure.

In a third aspect, the present disclosure provides a method for generating an optical frequency standard comprising:
  generating a first laser output at a first frequency;
  generating a frequency-doubled first laser output from the first laser output at a doubled first frequency;
  generating a second laser output at a second frequency different from the first frequency;
  generating a frequency-doubled second laser output from the second laser output at a doubled second frequency;
  stabilising a sum of the doubled first and the doubled second frequencies by
    generating a two-photon transition from a first energy level to a second energy level in an interaction region, the interaction region configured to receive as an input the frequency-doubled first laser output and the frequency-doubled second laser output, the frequency-doubled first laser output and the frequency-doubled second laser output selected to together cause the two-photon transition from the first energy level to the second energy level using an intermediate energy level to enhance the two-photon transition rate; and
    detecting an indicator of the two-photon transition occurring in the interaction region to generate a frequency stabilisation signal;
    modifying either the first laser output or the second laser output in accordance with the frequency stabilisation signal to stabilise the sum of the doubled first frequency and the doubled second frequency originating from the first and second laser sources to the two-photon transition based on the indicator; and generating a stabilised optical output with a frequency corresponding to the optical frequency standard by frequency summing the first laser output and the second laser output.

In another form, the method includes generating the first and/or second laser outputs in the telecommunications wavelength band.

In a fourth aspect, the present disclosure provides a system for generating an optical frequency standard stabilised to twice the wavelength of an input optical frequency standard including:

a first optical input to receive the input optical frequency standard;

a second optical input to receive the laser output of a laser source whose frequency is to be stabilised;

a frequency stabilisation arrangement including:

a second harmonic generator to frequency double the laser output to generate a frequency doubled laser output; and a frequency comparison module to compare the frequency of the frequency doubled laser output to the input optical frequency standard to generate a frequency control signal to frequency stabilise the laser output of the laser source to twice the wavelength of the optical frequency standard.

In another form, the input optical frequency standard is generated by an input system for generating an optical frequency standard based on a two-colour stabilisation arrangement.

In another form, the input system corresponds to that described in the first aspect of the disclosure.

In another form, the optical frequency standard is in the telecommunications wavelength band.

In a fifth aspect, the present disclosure provides an optical frequency standard generated by the system described in accordance with the fourth aspect of the disclosure.

In a sixth aspect, the present disclosure provides an optical frequency standard system comprising:

first and second lasers and respective frequency doublers to generate frequency doubled outputs of the first and second lasers;

a gas cell based two-colour stabilisation arrangement to frequency stabilise the sum of the frequency doubled outputs of the first and second lasers;

a frequency summer to sum the frequencies of the first and second lasers to generate the optical frequency standard.

BRIEF DESCRIPTION OF DRAWINGS

Embodiments of the present disclosure will be discussed with reference to the accompanying drawings wherein.

In the following description, like reference characters designate like or corresponding parts throughout the figures.

DESCRIPTION OF EMBODIMENTS

Figure 3:
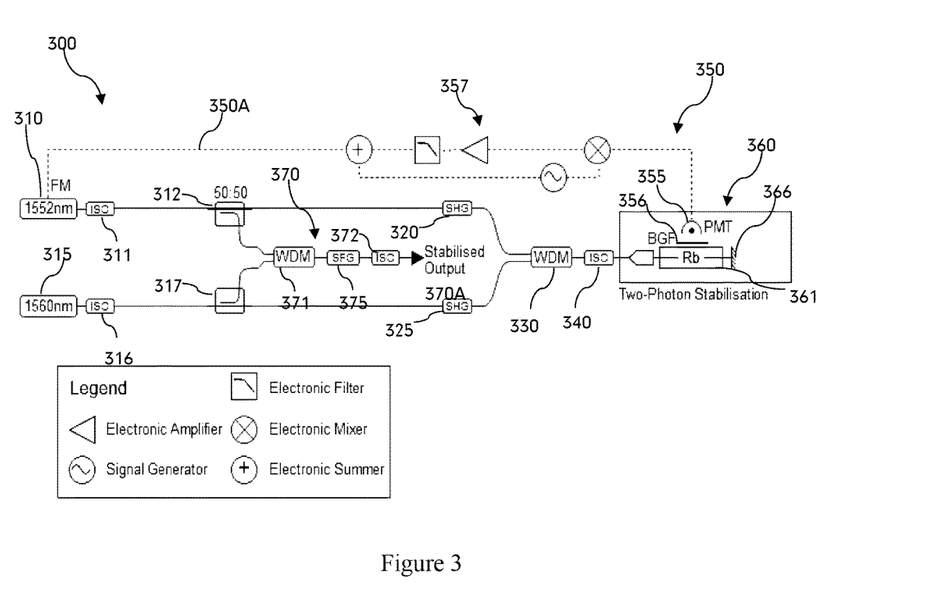
FIG. 3 is a system schematic of a system for generating an optical frequency standard according to an illustrative embodiment.

Referring now to FIG. 3, there is shown a system 300 for generating an optical frequency standard in accordance with an illustrative embodiment. Broadly, optical frequency standard generating system 300 is based on a two-colour approach and includes a first laser source 310 that generates a first laser output at a first frequency corresponding to a wavelength of 1552 nm and a second laser source 315 that generates a second laser output at a second frequency corresponding to a wavelength of 1560 nm. The first and second laser outputs are then respectively input into first and second second harmonic generators (SHG) 320, 325 to form frequency-doubled first and second laser outputs at a doubled first frequency 776 nm and a doubled second frequency 780 nm respectively. In this embodiment, laser outputs are conveyed by fibre optic cable (as generally indicated by solid black lines) and the first and second laser sources 310, 315, which in this example are fibre lasers, each include associated optical isolators (ISO) 311, 316 to reduce the effect of backscattered light affecting the frequency of the laser sources.

System 300 further includes a two-colour stabilisation arrangement 350 to stabilise the sum of the frequencies generated by first and second laser sources 310, 315 including an interaction region 360 incorporating a laser active material 361. In this illustrative embodiment, interaction region is a gas reference cell and the laser active material is Rubidium (in vapour form) having a two-photon transition as illustrated in FIG. 2 and configured to receive as an input the frequency-doubled first laser output and the frequency-doubled second laser output causing a two-photon transition from the first energy level (i.e., $5S_{1/2}$) to the second energy level ($5D_{5/2}$) using the intermediate energy level ($5P_{3/2}$) to enhance the two-photon transition rate. In this embodiment, the outputs from first and second SHGs 320, 325 are combined in a wavelength division multiplexer (WDM) 330 and passed through optical isolator 340 before entering interaction region 360. Stabilisation arrangement 350 in this embodiment also includes 100% reflective retro-reflection mirror 366 to assist in producing narrow Doppler-free line shapes.

Two-colour stabilisation arrangement 350 further includes a detector 355 to detect an indicator of the two-photon transition occurring in interaction region 360 which generates a frequency stabilisation signal 350A for in this case modifying the first laser source 310 to stabilise the sum of frequencies generated by the first and second laser sources 310, 315. In this illustrative embodiment, detector 355 is based on photomultiplier tube 355 detecting the 420 nm fluorescence measured through a blue glass filter (BGF) 356 as the electron returns to the $5S_{1/2}$ state via the intermediate $6P_{3/2}$ state as illustrated in FIGS. 1 and 2. In other embodiments, detector 350 may be based on a photodiode or an avalanche photodiode. BGF 356 may be any dichroic filter that passes 420 nm light and rejects the 780 nm and 776 nm light or more generally passes light of the expected fluorescence wavelength.

In yet another embodiment, the indicator of the two-photon transition occurring in interaction region 360 may be based on the absorption associated with this two-photon transition. Once again, a detector that measures changes in optical intensity such as a photomultiplier, photodiode or equivalent device may be employed to detect the absorption.

This detected fluorescence is used to control the frequency by frequency modulation (FM) control circuitry 357 shown in the dotted lines which ensures that the sum of the frequency-doubled 1552 nm and 1560 nm laser outputs is stabilised to the two-photon transition in accordance with frequency stabilisation signal 350A. In this illustrative embodiment, FM control is achieved by electronic modulation of the driving current of the first laser source 310. In this example, frequency modulation is at a rate of 600 kHz and a deviation of 2.5 MHz which is set/limited by the Rubidium two-photon transition, i.e., the modulation rate is limited by the second state lifetime and the deviation should typically match the transition linewidth, including Doppler broadening, to maximise the frequency stabilisation signal. As would be appreciated, use of a different transition or different atomic/molecular species will require different tuning of the rate and deviation of the frequency modulation.

This modulation is on frequency stabilisation signal 350A, which in turn frequency modulates its associated 776 nm second harmonic. The frequency modulation modulates the amplitude of the two-photon 420 nm fluorescence which is detected on photomultiplier tube 355. Control circuitry is implemented in accordance with techniques from the field of FM spectroscopy to feedback to the frequency of the first laser output to maintain the laser's frequency to be on resonance with the second energy level.

Further references to these techniques may be found in:
Demtroder, W. (2003). Laser Spectroscopy (3rd ed.). Springer; and
Bjorklund, G. C., Levenson, M. D., Lenth, W., & Ortiz, C. (1983). Frequency modulation (FM) spectroscopy. Applied Physics B Photophysics and Laser Chemistry, 32(3), 145-152,
whose contents are incorporated by reference in their entirety.

System 300 also includes a stabilised optical output generator 370 that includes a sum frequency generator 375 that receives as an input the first laser output and second laser output to generate a stabilised optical output 370A. In this illustrative embodiment, the first and second laser outputs go through respective fibre optic splitters 312, 317 which each take a fraction of the output, in this case 50%, which is then combined into a single mode fibre using WDM 371. The output from WDM 371 is then inputted into sum frequency generator 375, which then passes through optical isolator 372.

As would be appreciated, the exact fraction of output that is split from the first and second laser sources 310, 315 may be varied between near 0% to approximately 100% depending on tuning requirements and the power required in the stabilised optical output 370A. In various embodiments, the fraction of the output split off could be in the range 1%-10%, 10%-20%, 20%-30%, 30%-40%, 40%-50%, 50%-60%, 60%-70%, 70%-80% or 80%-90%, 90%-99%. In this manner, a stabilised optical output 370A having a wavelength of 778 nm is produced in accordance with FM control signal detected on detector 355.

Optical frequency standard generating system 300 is based on first and second laser sources operating in the telecommunications wavelength band which may be provided by fibre lasers. As an example, first laser source 310 may be a fibre laser operating at 1552 nm and similarly second laser source 315 may be a fibre laser operating at 1560 nm. As would be appreciated, laser sources 310, 315 need not necessarily be a fibre laser. Other types of laser sources that may be used include, but are not limited to, diode lasers, and distributed feedback (DFB) lasers, distributed Bragg reflector (DBR) lasers, or vertical external cavity surface emitting lasers (VECSEL). Desirable, but not necessarily critical characteristics of the laser sources may include, but are not limited to, single frequency mode, narrow line width, low amplitude noise, low phase noise, fast frequency control, low drift, linear polarisation, optically isolated output, and the capability to be fibre coupled.

As would be appreciated, by operating in the telecommunications wavelength band, optical fibres and associated commercial off the shelf fibre optic componentry may be employed, these components being designed to be compact and low power in line with requirements of the telecommunications industry. In this manner, a compact optical standard may be constructed that realises the advantages of the increased SNR of a two-colour stabilisation arrangement and hence stability of the resulting optical output.

Although interaction region 360 is conveniently implemented as a gas reference cell in the form of a Rubidium cell it will be understood that other types of gas reference cell comprising an atomic or molecular gas having a suitable atomic or molecular two photon transition may be used. In one example, the gas may be based on one of the other alkali or Group 1 elements (see for example Table 1 below). In other examples, the gas reference cell may be based on an isotopically pure version of the selected element which will generally reduce the complexity of the device as the number of potential transitions is reduced. As would also be appreciated other forms of interaction regions may also be used, including fibre arrangements such as a hollow-core photonic crystal fibre or alternatively a custom geometry cell or vacuum chamber.

As would be further appreciated, the two-colour stabilisation arrangement 350 is typically deployed in a light-proof arrangement such as a suitable container or box to avoid the impact of background light on any light detector. Such a container may also be configured to provide magnetic shielding to reduce magnetic fields that can perturb the atoms of the laser active material 361.

Figure 4:
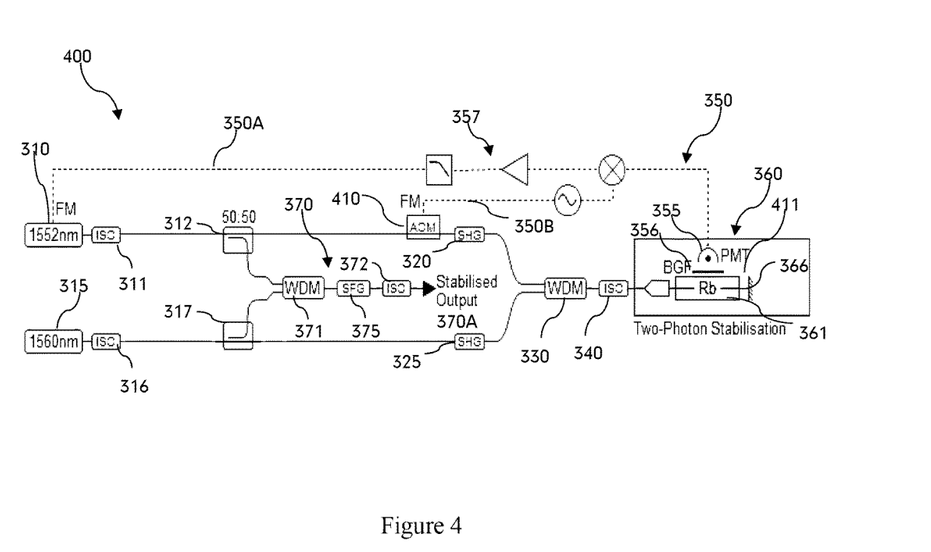
FIG. 4 is a system schematic of a system for generating an optical frequency standard according to another illustrative embodiment.

Referring now to FIG. 4, there is shown a system 400 for generating an optical frequency standard in accordance with another illustrative embodiment. Optical frequency standard generating system 400 in this embodiment includes a heating arrangement 411 comprising a heating block to elevate the temperature of interaction region 360 to between 25° C. to 150° C. to increase the rubidium density and as a result increasing the 420 nm fluorescence created by the two-photon transition and hence the stability of stabilised optical output 370A. In another embodiment the temperature of interaction region is elevated to between 100° C. to 150° C.

Optical frequency standard generating system 400 includes a modified frequency modulation arrangement including a frequency modulator in the form of acoustic optic modulator (AOM) 410 that frequency modulates the first laser output at a modulation frequency on-top of the fundamental or carrier frequency of the first laser output. This replaces the FM modulation being applied directly to the first laser source 310 in system 300 depicted in FIG. 3. In this illustrative embodiment, this additional modulation is at a frequency the same as system 300 although as would be appreciated this frequency may be different and potentially higher given the use of an AOM. This frequency modulation generates the amplitude modulation of the two-photon transition that is then detected by detector 355 and which is employed to generate frequency stabilisation signal 350A to stabilise, in this case, the first laser source 310 to the two-photon transition.

Figure 5:
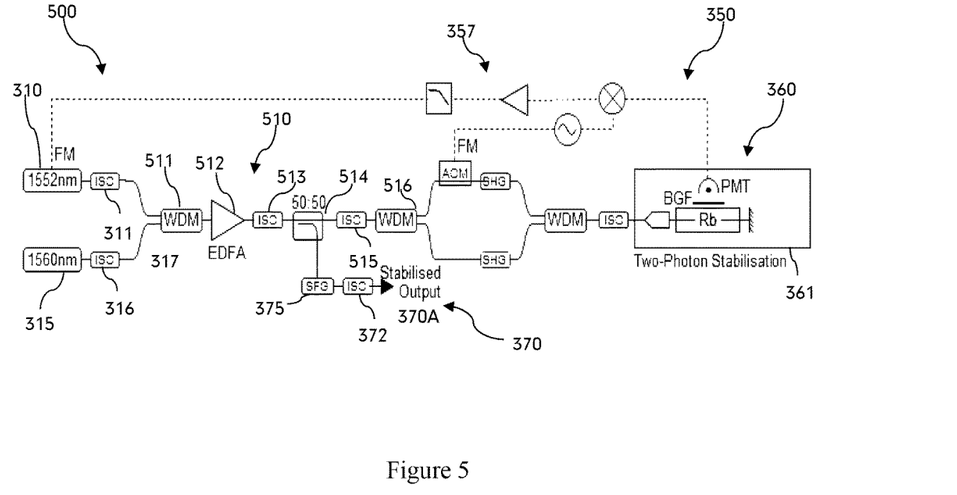
FIG. 5 is a system schematic of a system for generating an optical frequency standard according to yet another illustrative embodiment.

Referring now to FIG. 5, there is shown a system 500 for generating an optical frequency standard in accordance with yet another illustrative embodiment. Optical frequency standard generating system 500 in this embodiment includes an amplification stage 510 operable to increase the optical power of the first and second laser outputs prior to input into the two-colour stabilisation arrangement 360 and the sum frequency generator 375 to generate stabilised output 370A. In other embodiments, only one of the first or second laser outputs is amplified.

In this example, amplification stage 510 is based on an optical amplifier 512 in the form of a Erbium Doped Fibre Amplifier (EDFA) which functions to increase the optical power of the first and second laser sources 310, 315 and as a result improves the efficiency of the second harmonic generation stage to increase the power of the frequency-doubled 776 nm and 780 nm that is inputted into two-colour stabilisation arrangement 350. As would be appreciated, this increases the two-photon fluorescence signal and hence the stability of the stabilised optical output 370A as well as increasing the power of the stabilised output 370A resulting from sum frequency generator 375.

As with optical frequency standard generating systems 300, 400 depicted in FIGS. 3 and 4, system 500 includes first and second laser sources 310, 315, which in this example are 1552 nm and 1560 nm laser diodes that are optically isolated by optical isolators 311, 316. First and second laser outputs are combined into a single mode fibre by WDM 511 and then amplified by EDFA 512 and again isolated by optical isolator 513.

The amplified 1552 nm and 1560 nm laser outputs are then split between two fibres using a 50:50 fibre splitter 514. As has been previously stated, the exact splitting fraction need not necessarily be 50:50 but can vary according to configuration requirements. In other examples, the splitting fraction may be approximately 1:99, 10:90, 20:80, 30:70, 40:60, 50:50, 60:40, 70:30, 80:20, 90:10 or 99:1. In this example, one half is then passed to stabilised optical output generator 370 as previously described to generate the stabilised optical output 370A. The remaining 50% of the amplified 1552 nm and 1560 nm laser outputs is again passed through an optical isolator 515 and then separated into its component wavelengths using a further WDM 516. Following this stage, system 500 is identical in setup to system 400.

Figure 6:
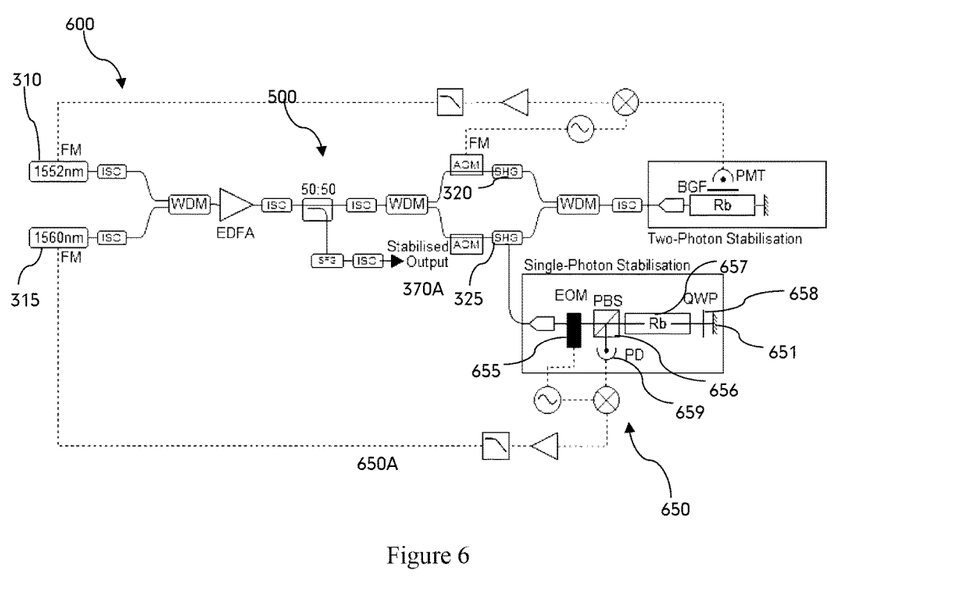
FIG. 6 is a system schematic of a system for generating an optical frequency standard according to a further illustrative embodiment.

Referring now to FIG. 6, there is shown a system 600 for generating an optical frequency standard in accordance with yet another illustrative embodiment. Optical frequency standard generating system 600 is based on system 500 and includes a further single-photon stabilisation arrangement 650 for stabilising the frequency-doubled laser output that corresponds to the transition from the first energy level to the intermediate energy level.

The detuning, $\Delta$, or difference of the frequency-doubled 780 nm laser output from the intermediate energy level or transition state $5P_{3/2}$ (as illustrated in FIGS. 1 and 2), in combination with the optical powers involved, can produce small perturbations to the atoms energy levels. Similarly, the difference of the frequency-doubled 776 nm laser from the intermediate energy level will cause the same effect. As a result, variations in the intermediate state detuning can reduce the stability of the optical frequency standard. The single-photon stabilisation arrangement 650 stabilises the frequency of the doubled 1560 nm laser (i.e., 780 nm) to the single photon $5S_{1/2} \rightarrow 5P_{3/2}$ transition, see FIG. 2, which stabilises the intermediate state detuning and as a result increases the stability of the stabilised optical output 370A.

Single-photon stabilisation arrangement 650 takes a fraction of the 780 nm frequency-doubled laser output from SHG 325 into free-space and passes this laser output through an electro-optic modulator (EOM) 655 which produces an optical component with a fixed frequency offset from the main 780 nm laser between 1 and 5 GHz. The laser light that is shifted by EOM 655 is modulated so that the signal detected by the photodiode 659 can be used to stabilise the 1560 nm laser 315 to the 780 nm transition with a fixed frequency offset between 1 and 5 GHz.

Single-photon stabilisation arrangement 650 is based on a saturation absorption spectroscopy arrangement. Typically, in these types of systems two lasers are involved such as a strong pump beam and a weak probe beam. Single-photon stabilisation arrangement 650 in this example is based on the second laser output following frequency doubling with the equivalent pump beam travelling left to right through Rubidium cell 657. The resulting probe beam following reflection from mirror 651 is then attenuated, typically with a neutral density filter (NDF) (not shown) and travels right to left after reflection.

To detect the probe beam, the polarisation of the probe beam is rotated by half a wave by double passing through quarter wave plate 658. At the polarisation beam splitter (PBS) 656 the new probe beam now with a half wave polarisation rotation exits via a different port to the one that the pump beam entered and is detected on a detector 659 in the form of a photodiode. The signal measured by detector 659 is the spectra of the Doppler broadened $5P_{3/2}$ transition with narrow spectral features with reduced absorption that coincide with the underlying hyperfine transition. The purpose of saturation absorption spectroscopy arrangement is to create these narrow features, typically 5-10 MHz in the case of the first to intermediate transition, 100 times narrower than the Doppler broadened transition. These narrow features are used as a target to generate single-photon stabilisation control signal 650A to frequency modulate the 780 nm laser to lock onto these narrow features and as a result stabilising the detuning from the intermediate state.

As would be appreciated, while in system 600 the detuning stabilisation is applied to the second laser source 310 it could equally be applied to the first laser source 315 to stabilise detuning and enhance the two-colour transition. To avoid perturbation effects as described above stabilisation may then be required for the first laser source 315. In another embodiment, the single-photon stabilisation arrangement could be applied to the output of the first or second laser sources directly by similar techniques as described above as opposed to the frequency doubled output depicted in FIG. 6.

Figure 7:
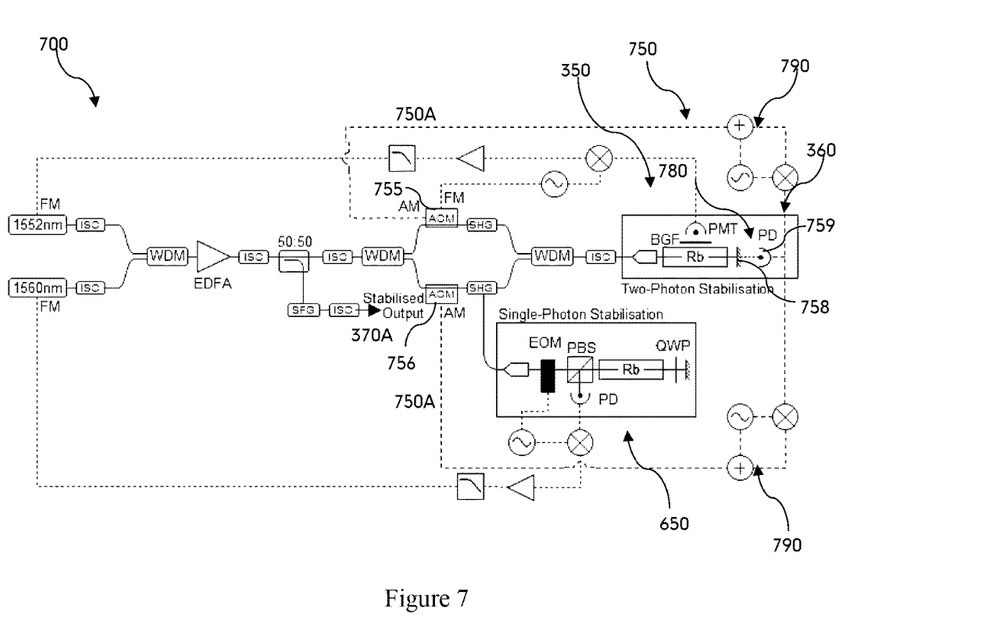
FIG. 7 is a system schematic of a system for generating an optical frequency standard according to an illustrative embodiment.

Referring now to FIG. 7, there is shown a system 700 for generating an optical frequency standard in accordance with a further illustrative embodiment. Optical frequency standard generating system 700 is based on system 600 and includes a power control arrangement 750 for amplitude modulation (AM) of in this example both the 1552 nm laser output and the 1560 nm laser output. The associated power control electronics of power stabilisation arrangement are depicted in the dashed lines. As would be appreciated, variations in the optical power, depending on their significance, may perturb the atoms energy levels and potentially reduce the stability of any optical frequency standard.

Power control arrangement 750 includes a first laser output amplitude modulator 755 for modulating in this embodiment the 1552 nm laser output and a second laser output amplitude modulator 756 for modulating the 1560 nm laser output. In this embodiment, amplitude modulators 755, 756 are AOMs and by comparison to FIG. 3, the AOM 410 forming part of the two-colour stabilisation arrangement 750 may also be adopted for this amplitude modulation function. As would be appreciated, both laser outputs do not necessarily require stabilisation and in this case the selection of which laser output requires stabilisation may depend on the inherent stability characteristics of the laser sources.

Power control arrangement 750 further includes an optical power or optical amplitude detector 780 which in this example includes the retro-reflection mirror 758 forming part of the interaction region 360 and a light intensity detector 759 in the form of a photodiode (PD). Retro-reflection mirror 758 is partially transparent and allows 1% to 5% of the light from, in this case, the rubidium cell to pass through to photodiode 759 which detects the amplitude modulation (AM) that the AOMs 755, 756 modulated on the two lasers output. This detected amplitude modulation then provides a measure of the lasers optical power that is interacting with the interaction region 360. The electronic signal produced by optical amplitude detector 780 is then processed by amplitude modulation control circuitry 790 to generate power control signal 750A and sent to the AOMs 755, 756 to stabilise or control the optical power.

In this embodiment, AOMs 755, 756 function to amplitude modulate the optical power from 0 to 100% very quickly at a known frequency in accordance with the respective signal generators as indicated. The frequency of modulation is different for the two lasers, allowing individual identification when detected on optical power detector 780. Both modulation frequencies are greater than the frequency used for frequency modulation to stabilise the laser to the two-photon transition. Optical power detector 780 observes both modulations and the amplitude or power modulation circuitry 790 produces a voltage that is proportional to the 100% power level hitting the detector 780. If this power level changes, the associated amplifier and filter (not shown) will correct the 100% power level for each respective laser source.

In another embodiment, a wavelength selective optic, in this example a diffraction grating, may be used to spatially separates the two beams prior to optical power detector 759 to facilitate more efficient detection of the two lasers. Each laser can then be detected on separate optical power detectors, replacing photodiode 759, which observe the laser modulations and feed into power modulation circuitry 790.

In another embodiment, the power of each laser may be controlled without the need for amplitude modulation of the lasers. In this example, the laser powers are not modulated, and as a result, the two lasers will require spatial separation and be detected on separate optical power detectors. In one example, this spatial separation of the two beams may be achieved employing a diffraction grating. The detected optical power is then compared to a stable voltage reference, replacing power modulation circuitry 790 for each channel, to then generate power control signal 750A which is sent to the AOMs 755, 756 to stabilise or control the optical power.

Accordingly, in this illustrative embodiment the 1552 nm laser output is subject to both amplitude or power modulation as well as frequency modulation to produce the frequency-doubled 776 nm laser output that forms an input into the two-colour stabilisation arrangement 350. In this example, the 1560 nm laser output is amplitude modulated for power stabilisation of the 780 nm laser within the two-colour stabilisation arrangement 350.

As would be appreciated, optical frequency standard generating system 700 involves the stabilisation of the sum of the 1560 nm and 1552 nm laser outputs to the two-photon transition forming the basis of the two-colour stabilisation arrangement 350 and further the 1560 nm is stabilised to the single-photon stabilisation arrangement 650 (see FIG. 6). The stabilised laser outputs are then summed together using a sum frequency generator (SFG) to produce a stabilised laser output 370A at 778 nm which is optically stabilised to half the transition frequency of the two photon transition.

Although optical frequency standard generating system 700 includes a number of sophisticated control arrangements to enhance the stability of the system it may still be realised in a compact configuration. In one example, system 700 may be configured or packaged to fit within a 19" rack having a width of 482.6 mm, 600 mm deep and 150 mm tall and having a weight in the range of 10-15 kg. Such a compact and even portable system may be configured to have a frequency stability corresponding to $10^{-14}$ fractional stability at 1 second integration time and more generally to $10^{-14}/\sqrt{\tau}$ fractional stability where $\tau$ is the integration time for $\tau > 1$ second and below 10000 seconds.

Figure 8:
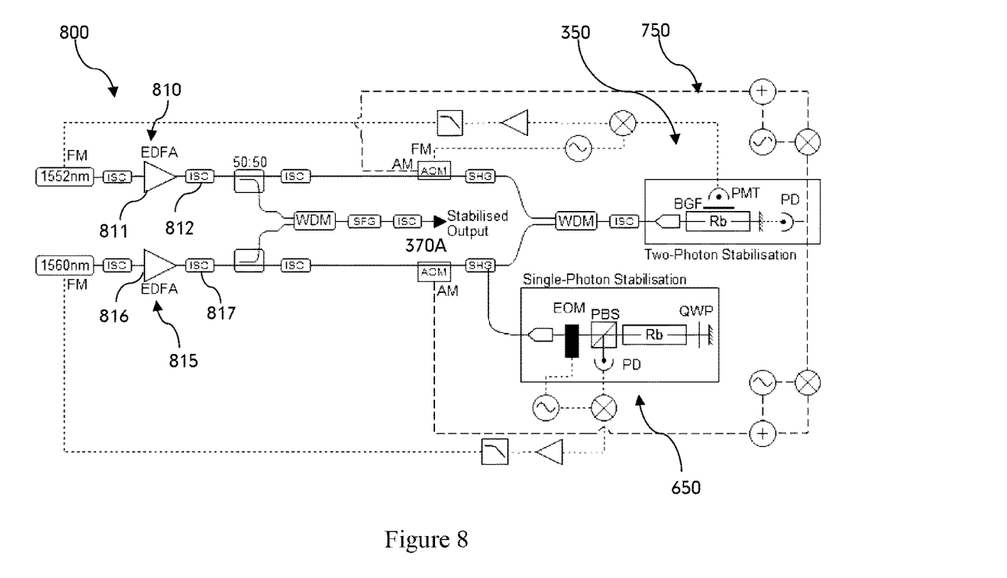
FIG. 8 is a system schematic of a system for generating an optical frequency standard according to another illustrative embodiment.

Referring now to FIG. 8, there is shown a system 800 for generating an optical frequency standard in accordance with another illustrative embodiment. Similar to optical frequency standard generating system 700 depicted in FIG. 7, system 800 includes a two-colour stabilisation arrangement 350, a single-photon stabilisation arrangement 650 and a power control arrangement 750. By comparison to system 700, optical frequency standard generating system 800 includes a split optical configuration for each laser output similar to system 300 as depicted in FIG. 3 except to include further optical amplification stages 810, 815 each including an EDFA optical amplifier 811, 816 and optical isolator 812, 817 respectively.

Figure 9:
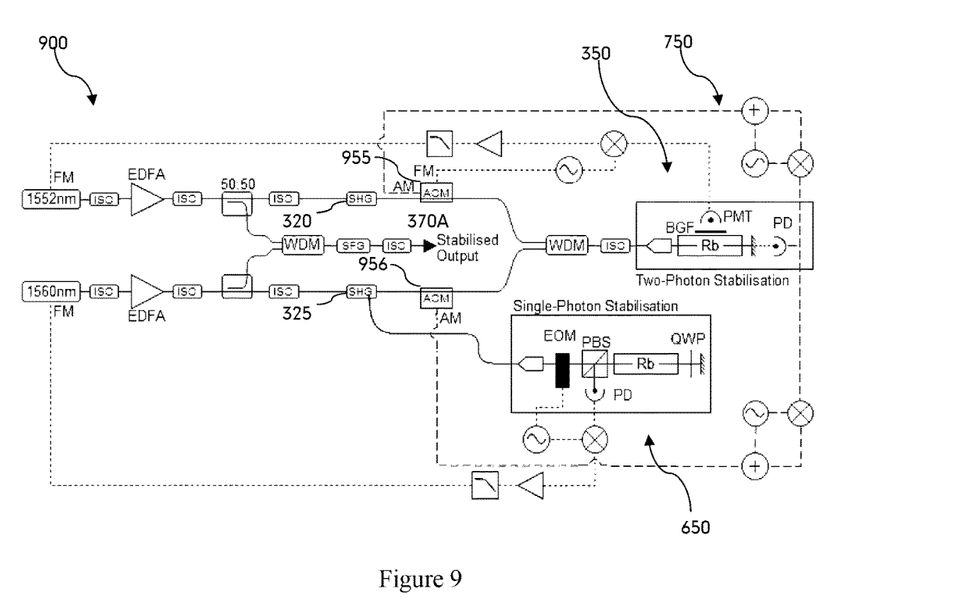
FIG. 9 is a system schematic of a system for generating an optical frequency standard according to yet another illustrative embodiment.

Referring now to FIG. 9, there is shown a system 900 for generating an optical frequency standard in accordance with yet another illustrative embodiment, optical frequency standard generating system 900 is similar to system 800 depicted in FIG. 8, except that the frequency and amplitude modulators of the two-colour stabilisation arrangement 350, single-photon stabilisation arrangement 650 and power control arrangement 750 in the form of AOMs 955, 956 (corresponding to AOMS 755, 756) depicted in FIG. 7 now receive as an input the frequency-doubled laser output for each laser source as provided by SHGs 320, 325 (see also FIG. 3).

For the case where the first and second laser sources are operating in the telecommunication wavelength band, the AOMs in the earlier embodiments may be fibre integrated components. In the case where the amplitude and frequency modulation occurs after frequency doubling, this implies that AOMs, for this embodiment, will operate at 780 nm and 776 nm and as a result would not be typically fibre integrated. As a consequence, free-space optics would generally be required at this stage of the optical configuration.

In other embodiments, other control systems may be utilised to control any residual amplitude modulation created by frequency modulation of the first or second laser sources using a respective AOM. In one example, a photodiode may be deployed to detect this residual amplitude modulation prior to the two-colour stabilisation arrangement 350 and control systems can then be configured to remove this noise source by injecting a compensating signal into the AOM with appropriate amplitude and phase.

Figure 10:
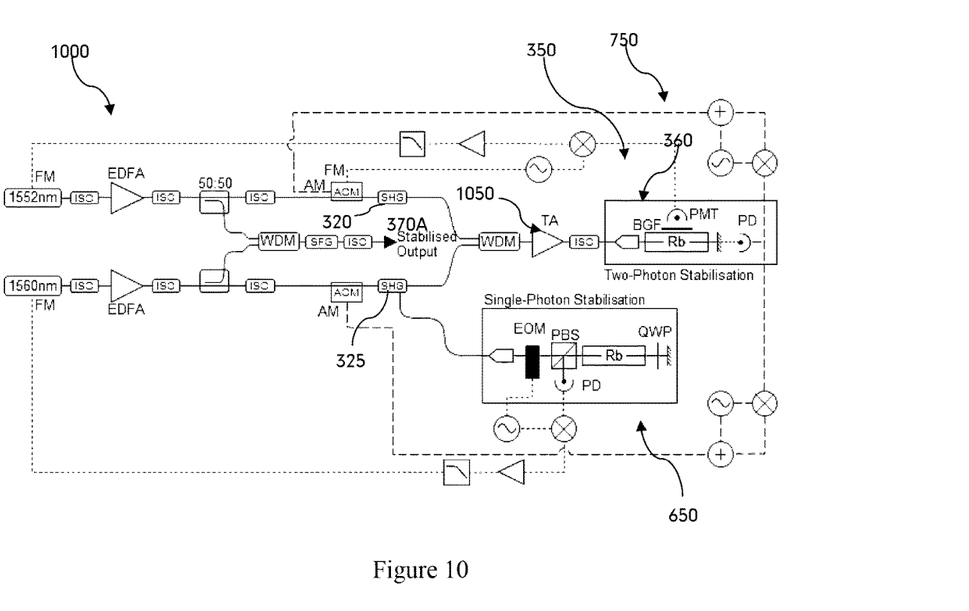
FIG. 10 is a system schematic of a system for generating an optical frequency standard according to a further illustrative embodiment.

Referring now to FIG. 10, there is shown a system 1000 for generating an optical frequency standard in accordance with another illustrative embodiment. Similar to optical frequency standard generating system 800 depicted in FIG. 8, system 1000 includes a two-colour stabilisation arrangement 350, a single-photon stabilisation arrangement 650 and a power control arrangement 750. By comparison to previous systems described above, optical frequency standard generating system 1000 includes a further optical amplification stage 1050 immediately prior to input into interaction region 360 in the form of a tapered amplifier which functions to amplify the power of the frequency-doubled laser outputs by a factor of about 100 as result reducing the efficiency requirements for SHGs 320, 325.

Figure 11:
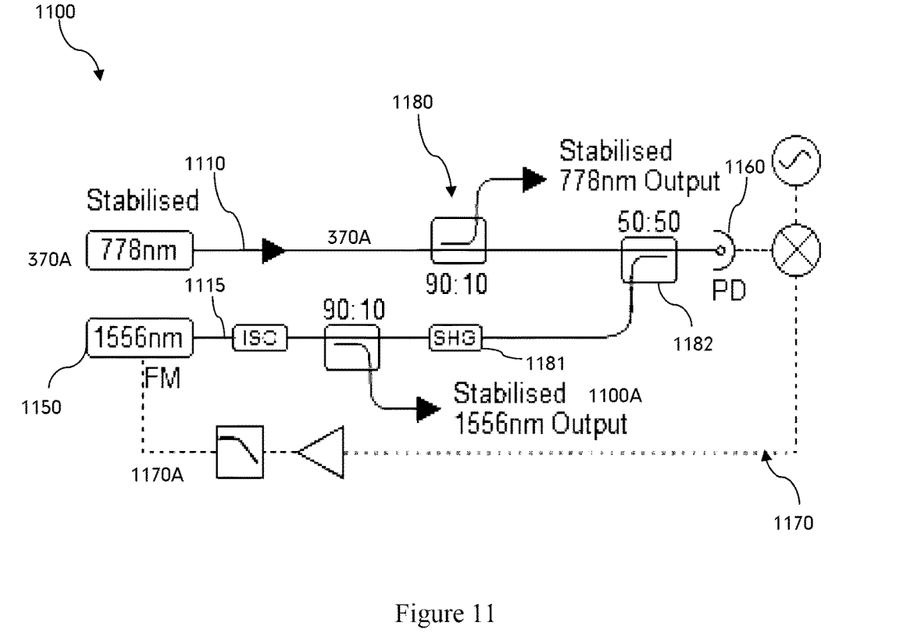
FIG. 11 is a system schematic for generating an optical frequency standard in the telecommunications wavelength band according to an illustrative embodiment.

Referring now to FIG. 11, there is shown a system 1100 for generating an optical frequency standard in the telecommunications wavelength band in accordance with an illustrative embodiment. In this illustrative embodiment, telecommunications wavelength band optical frequency standard generating system 1100 generates a stabilised output 1100A having a wavelength of 1556 nm based on an input optical standard having a wavelength of 778 nm. As would be appreciated, system 1100 will produced an optical frequency standard 1100A double the wavelength of the input optical standard 370A.

System 1100 includes a first input 1110 for the optical frequency standard 370A and a second input 1115 for the laser source 1150 whose doubled frequency is to be stabilised to the optical frequency standard and an output control frequency modulation control signal 1170A to frequency modulate the laser source 1150 generated by frequency stabilisation arrangement 1180. In this illustrative embodiment, frequency stabilisation arrangement 1180 includes a SHG 1181 that receives as an input the output from laser source 1150 to form a frequency-doubled laser source output.

Frequency stabilisation arrangement 1180 further includes frequency comparison module that includes an optical combiner 1182 that receives optical frequency standard 370A and the frequency-doubled laser source and detector 1160, in the form of a photodiode (PD), to detect an optical beat note from optical combiner 1182. The output from PD 1160 is processed by control circuitry 1170 to generate frequency modulation control signal 1170A, as a result frequency stabilising the 1556 nm laser source output to the stable 778 nm output and generating a stabilised optical output 1100A at 1556 nm. Accordingly, the frequency stability of the two-photon frequency standard 370A is mapped onto the 1556 nm laser in the telecommunications band.

In this case, frequency standard 370A is mapped onto the 1556 nm laser 1150 within the conventional "C Band" (1530 to 1565 nm) of the telecommunication band of wavelengths corresponding to the lowest loss region for silica fibre where the majority of telecommunications traffic is located. Throughout this specification the term telecommunications band is taken to correspond to the wavelength range of 1260 nm and 1675 nm. As generally recognised, there are 6 different telecommunications subsidiary bands in this wavelength range defined as:

O band (original) 1260 to 1360 nm;
E band (extended) 1360 to 1460 nm;
S band (short wavelengths) 1460 to 1530 nm;
C band (conventional) 1530 to 1565 nm;
L band (long wavelengths) 1565 to 1625 nm; and
U band (ultralong wavelengths) 1625 to 1675 nm.

As would be appreciated, an output optical frequency standard in the telecommunications wavelength band is of great utility to many applications within the telecommunications industry. One example includes high-quality optical frequency combs constructed in the telecommunications wavelength band that require an input optical frequency standard as a time reference which could be readily provided by 1100 A.

Figure 12:
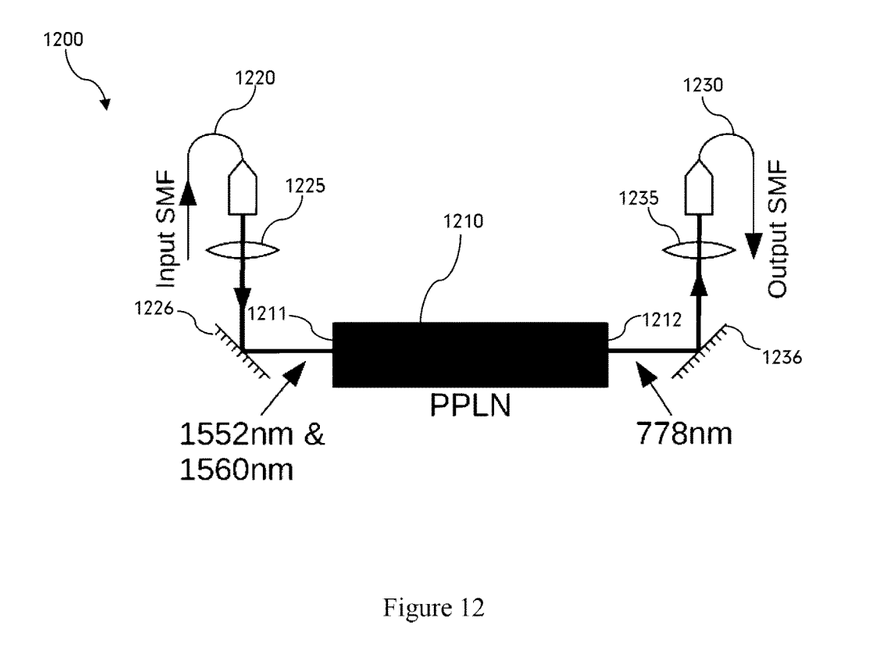
FIG. 12 is a system schematic of sum frequency generator according to an illustrative embodiment.

Referring now to FIG. 12, there is shown a sum frequency generator 1200 according to an illustrative embodiment. As would be appreciated, a sum frequency generator is a component of the two-colour optical frequency standard generating systems described above that functions to sum together the frequencies of the first laser output and the second laser output to generate the stabilised optical output.

In this example, sum frequency generator 1200 includes a nonlinear wavelength conversion medium 1210 in the form of a periodically poled lithium niobate (PPLN) crystal having an entry face 1211 and an exit face 1212. In this example, the combined laser outputs from single mode fibre (SMF) input 1220 is focused using focusing lens 1225 to increase the optical intensity and diverted by mirror 1226 to the entry face 1211 of PPLN crystal 1210. In this embodiment, the length of PPLN crystal 1210 is approximately 40 mm with the length being one determinant of conversion efficiency. In other embodiments, the length may range from, 5 mm-10 mm, 10 mm-20 mm, 20 mm-30 mm, 30 mm-40 mm, 40 mm-50 mm, 50 mm-60 mm or 60 mm-70 mm.

The summed laser output then leaves exit face 1212 and is coupled into SMF output 1230 via mirror 1236 and optical element 1235. In another embodiment, sum frequency generator 1200 includes a heater to heat and maintain the temperature of PPLN crystal 1210 to improve its conversion frequency. In one example, the PPLN crystal 1210 is heated to 40° C. by heating means (not shown) and this temperature then maintained to within 100 mK. As would be appreciated, depending on the exact PPLN crystal employed, the heating temperature may range from 30° C.-200° C.

In another embodiment, the conversion efficiency of sum frequency generator 1200 is increased by utilising waveguide technology to maintain high optical intensities along the length of PPLN crystal 1210 by maintaining a small optical mode along the length of the crystal to enhance the single-pass conversion efficiency. This can significantly reduce the optical power required to generate the required double frequency optical power and may avoid the use of EDFA amplification in some embodiments. Other examples of nonlinear wavelength conversion mediums that may be employed include periodically poled potassium titanyl phosphate (PPKTP).

Figure 13:
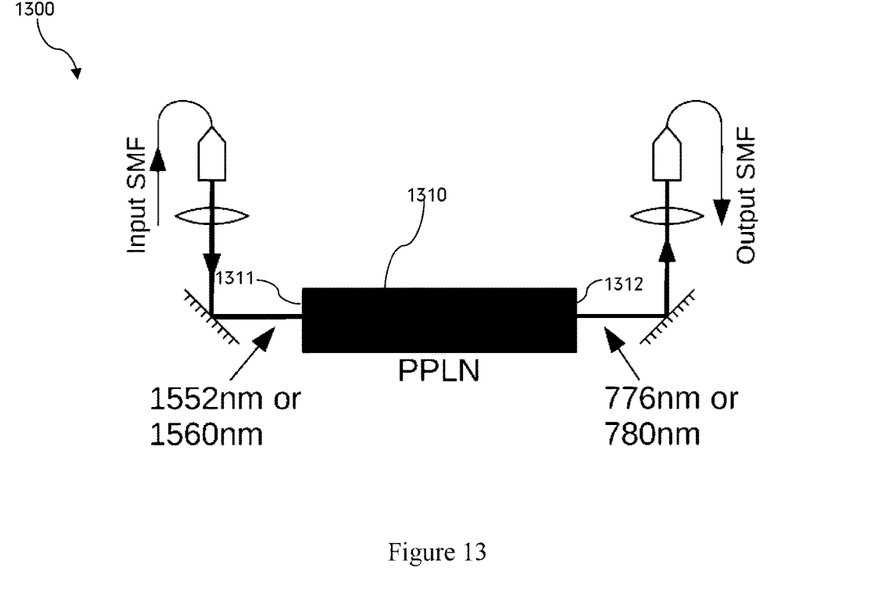
FIG. 13 is a system schematic of a second harmonic generator according to an illustrative embodiment.

Referring now to FIG. 13, there is shown a second harmonic generator 1300 according to an illustrative embodiment. As would be appreciated, a second harmonic generator is an optical component of the optical frequency standard generating systems described above that functions to double the frequency of any laser input. In the embodiments described above, the second harmonic generator functions to produce 776 nm and 780 nm laser outputs by frequency doubling 1552 nm and 1560 nm laser outputs respectively. The process of frequency doubling may be referred to as second harmonic generation.

Second harmonic generator 1300 is a single pass configuration and resembles the sum frequency generator 1200 illustrated in FIG. 12 including a (PPLN) crystal 1310 having an entry face 1311 and an exit face 1312 and an equivalent setup for the input and output optics and fibre coupling. As can be seen, for an input frequency of 1552 nm or 1560 nm at entrance face 1311, an output frequency of 776 nm or 780 nm is produced respectively at exit face 1312.

Although, second harmonic generator 1300 has the advantage of a small number of optical components and is mechanically robust, the input efficiency of the PPLN crystal is quadratic with input power providing relatively low conversion efficiency. As an example, a conversion efficiency of approximately 2.5% is achievable for a 40 mm long crystal with 1 Watt of input 1552 nm light. At these efficiencies, in order to produce the required optical power to drive a two-photon transition, an EDFA or other optical amplifier will generally be required to produce approximately 10 Watts of both 1552 nm and 1560 nm light. This can have implications in relation to power consumption which may be an issue depending on packaging or deployment requirements.

Figure 14:
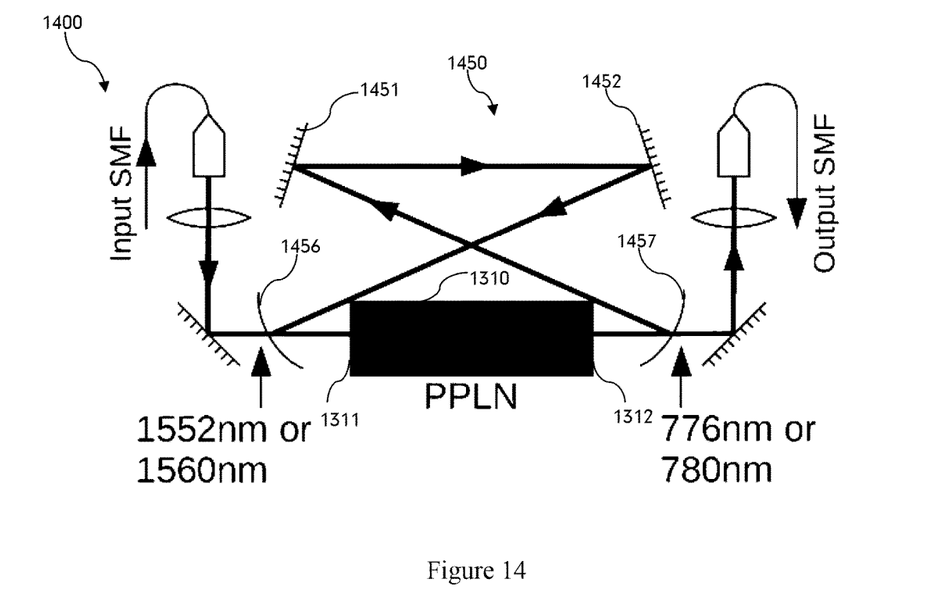
FIG. 14 is a system schematic of a second harmonic generator according to another illustrative embodiment.

Referring now to FIG. 14, there is shown a second harmonic generator 1400 according to another illustrative embodiment that includes an optical cavity 1450 to recycle the optical power that was not converted to the second harmonic. The input light is focussed into the PPLN crystal 1310. Concave mirror 1457 reflects the 1552/1560 nm light and transmits the 776/780 nm light. The concave mirror 1457 collimates the beam and reflects it towards mirror 1451. The beam forms a second focal point between mirrors 1451 and 1452. Mirror 1452 reflects the 1552/1560 nm light towards the second concave mirror 1456 which focuses the light into the PPLN crystal 1310 again. When the cavity is resonant this pattern is repeated for any 1552/1560 nm light that remains after traversing the PPLN crystal 1310. This recycles the 1552/1560 nm light increasing the efficiency of conversion to 776/780 nm light.

In one example, conversion efficiencies may be increased to as high as 50% at input powers of 0.5 Watts producing 0.25 Watts of 776 nm or 780 nm light which is sufficient to drive the two-photon transition and only requiring an EDFA output of 0.5 Watts for both 1552 nm and 1560 nm laser outputs. As would be appreciated, the potential drawback of this configuration is the added complexity of optical cavity 1450 which may introduce mechanical instability making the system less robust. Another potential consideration is that the length of the cavity will need to be substantially maintained at its resonance condition which will generally involve a further control system that the single-pass configuration of second harmonic generator 1300 will not require.

As with the sum frequency generator 1200 illustrated in FIG. 12, the efficiency of the second harmonic generator may also be increased by utilising waveguide technology which will significantly reduce the optical power required to produce the required optical power of sum-frequency light and may again avoid the use of EDFA amplification.

Although in the above embodiments the Rubidium $5S_{1/2} \rightarrow 5D_{5/2}$ transition is employed, in a further embodiment the $5S_{1/2} \rightarrow 5D_{3/2}$ transition may be used based on essentially the same optical and electronic implementation with the only modification being that the 1552 nm laser would need to be tuned to a slightly different wavelength.

Other two-photon transitions that may be adopted in line with above embodiments are set out in Table 1 below.

TABLE 1

| Metal | Two-Photon Transition | Two-Photon Wavelength (nm) | Single-Photon Transition | Single-Photon Wavelength (nm) | Wavelength Difference (nm) |
| --- | --- | --- | --- | --- | --- |
| Li | 2S → 3D | 639 | 2S → 2P | 671 | 32 |
| Na | 3S → 3D | 685 | 3S → 3P | 590 | 95 |
| K  | 4S → 3D | 929 | 4S → 4P | 770 | 159 |
| Cs | 6S → 7D | 910 | 6S → 6P | 894 | 16 |
| Fr | 7S → 7D | 825 | 7S → 7P | 817 | 8 |

As would be appreciated, two-colour system constructed in accordance with the embodiments described above and based on the two-photon transitions in Table 1 may be useful for a number of metrology purposes. As an example, such systems may be used to stabilise an optical frequency comb which could then translate the stability of the generated optical frequency standard to any part of the optical or microwave spectrum as required.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A system for generating an optical frequency standard comprising:
   a first laser source configured to generate a first laser output at a first frequency;
   a first second harmonic generator configured to receive as an input the first laser output to generate a frequency-doubled first laser output at a doubled first frequency;
   a second laser source configured to generate a second laser output at a second frequency different from the first frequency;

a second second harmonic generator configured to receive as an input the second laser output to form a frequency-doubled second laser output at a doubled second frequency;

a two-colour stabilisation arrangement configured to stabilise a sum of the doubled first and the doubled second frequencies including:

an interaction region incorporating a laser active material, the laser active material having a two-photon transition from a first energy level to a second energy level, the interaction region configured to receive as an input the frequency-doubled first laser output and the frequency-doubled second laser output, the frequency-doubled first laser output and the frequency-doubled second laser output selected to together cause the two-photon transition from the first energy level to the second energy level using an intermediate energy level to enhance the two-photon transition rate; and a detector configured to detect an indicator of the two-photon transition occurring in the interaction region, the detector generating a frequency stabilisation signal for modifying either the first laser output or the second laser output to stabilise the sum of the doubled first frequency and the doubled second frequency originating from the first and second laser sources to the two-photon transition based on the indicator;

a stabilised optical output generator including a sum frequency generator configured to receive as an input the first laser output and the second laser output to generate a stabilised optical output with a frequency corresponding to the optical frequency standard.

2. The system for generating an optical frequency standard as claimed in claim 1, wherein the first and/or second frequency is in the telecommunications wavelength band.

3. The system for generating an optical frequency standard as claimed in claim 1, wherein the interaction region is a gas reference cell.

4. The system for generating an optical frequency standard as claimed in claim 3, wherein the gas reference cell is based on an isotopically pure gas.

5. The system for generating an optical frequency standard as claimed in claim 3, wherein the gas reference cell is based on a Group I element.

6. The system for generating an optical frequency standard as claimed in claim 5, wherein the gas reference cell is a Rubidium cell.

7. The system for generating an optical frequency standard as claimed in claim 1, wherein the indicator of the two-photon transition occurring in the interaction region is fluorescence emitted from the interaction region as atoms transition either directly or indirectly from the second energy level to the first energy level.

8. The system for generating an optical frequency standard as claimed in claim 1, wherein the indicator of the two-photon transition occurring in the interaction region is the absorption of the frequency-doubled first and/or second laser output associated with the two-photon transition.

9. The system for generating an optical frequency standard as claimed in claim 1, further including a single-photon stabilisation arrangement for stabilising the first or second laser output, or the doubled first frequency or the doubled second frequency of the first or second frequency-doubled laser output respectively.

10. The system for generating an optical frequency standard as claimed in claim 9, wherein the single-photon stabilisation arrangement is to stabilise detuning from the intermediate energy level.

11. The system for generating an optical frequency standard as claimed in claim 1, wherein the two-colour stabilisation arrangement further includes a frequency modulator configured to frequency modulate the first and/or second laser output at a modulation frequency for detection by the detector following the two-photon transition to generate the frequency stabilisation signal.

12. The system for generating an optical frequency standard as claimed in claim 1, further including an optical amplification stage configured to increase the optical power of the first and/or second laser output.

13. The system for generating an optical frequency standard as claimed in claim 1, further including a power control arrangement configured to modulate and/or stabilise the amplitude of the first and/or second laser output.

14. The system for generating an optical frequency standard as claimed in claim 13, wherein the power control arrangement includes an amplitude modulator configured to modulate the amplitude of the first and/or second laser output and a detector to detect the amplitude modulation on the first and/or second laser output following passage through the interaction region to provide a measure of the optical power from the first and/or second laser output interacting with the interaction region to generate a power control signal to stabilise the optical power in the interaction region.

15. The system for generating an optical frequency standard as claimed in claim 1, wherein the first and/or second laser is selected from any one of: a fibre laser; a diode laser; a distributed feedback (DFB) laser; a distributed Bragg reflector laser; or a vertical external cavity surface emitting laser (VECSEL).

16. An optical frequency standard generated by the system claimed in claim 1.

17. A method for generating an optical frequency standard comprising:

generating a first laser output at a first frequency;

generating a frequency-doubled first laser output from the first laser output at a doubled first frequency;

generating a second laser output at a second frequency different from the first frequency;

generating a frequency-doubled second laser output from the second laser output at a doubled second frequency;

stabilising a sum of the doubled first and the doubled second frequencies by generating a two-photon transition from a first energy level to a second energy level in an interaction region, the interaction region configured to receive as an input the frequency-doubled first laser output and the frequency-doubled second laser output, the frequency-doubled first laser output and the frequency-doubled second laser output selected to together cause the two-photon transition from the first energy level to the second energy level using an intermediate energy level to enhance the two-photon transition rate; and detecting an indicator of the two-photon transition occurring in the interaction region to generate a frequency stabilisation signal;

modifying either the first laser output or the second laser output in accordance with the frequency stabilisation signal to stabilise the sum of the doubled first frequency and the doubled second frequency originating from the first and second laser sources to the two-photon transition based on the indicator; and generating a stabilised optical output with a frequency corresponding to the optical frequency standard by frequency summing the first laser output and the second laser output.

18. The method of claim 17, including generating the first and/or second laser outputs in the telecommunications wavelength band.

19. An optical frequency standard system comprising:
first and second lasers and respective frequency doublers to generate frequency doubled outputs of the first and second lasers;
a gas cell based two-colour stabilisation arrangement to frequency stabilise the sum of the frequency doubled outputs of the first and second lasers;
a frequency summer to sum the frequencies of the first and second lasers to generate the optical frequency standard.

* * * * *